| Ratio | Cl. 86 | Cl. 84 | Br. 138 | Br. 142 | Br. 132 | Cl. 130 | O.W.B. 136 | O.W.C. 140 |
|---|---|---|---|---|---|---|---|---|
| Lo | X | | HB | X | | | X | |
| 2nd | X | X | | X | | | | |
| 3rd | X | | HB | | | X | X | |
| Hi | X | X | | | | X | | |
| Rev. | | X | | | X | | | X |

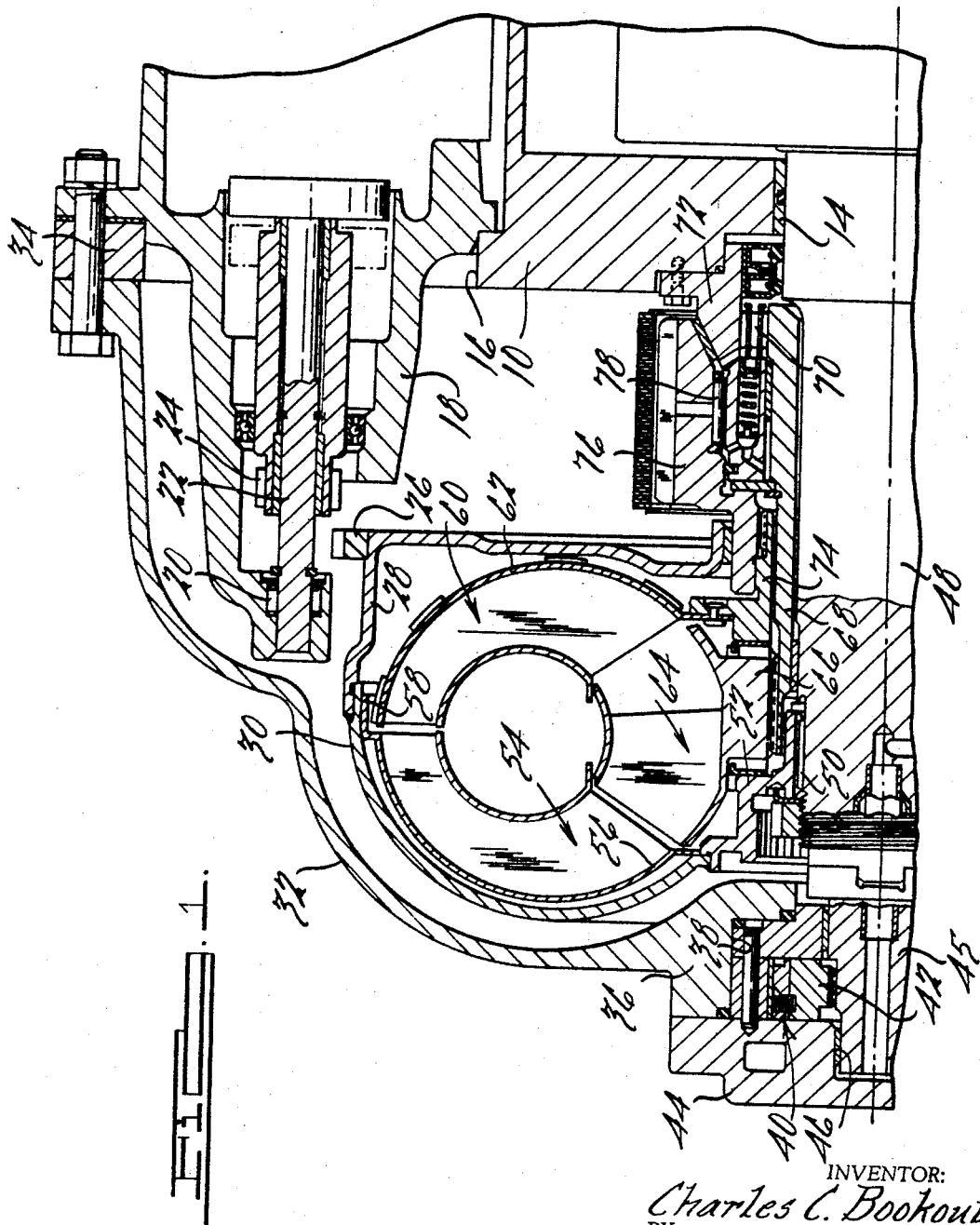

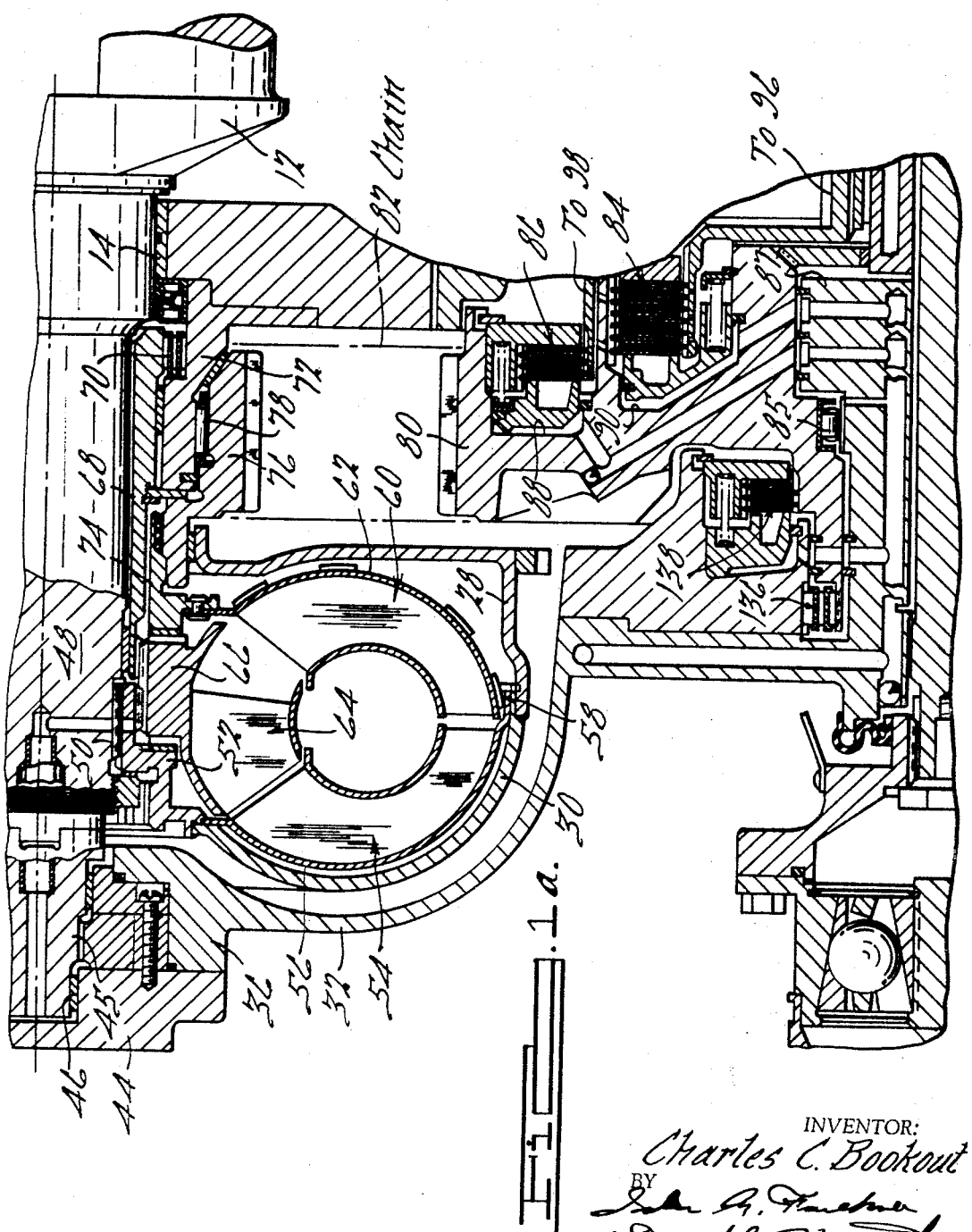

INVENTOR:
Charles C. Bookout
BY
ATTORNEYS

United States Patent Office 3,446,095
Patented May 27, 1969

3,446,095
TRANSVERSE AUTOMOTIVE VEHICLE DRIVE-LINE WITH A FOUR-SPEED RATIO AUTOMATIC TRANSMISSION AND SIMULATED OVERDRIVE
Charles C. Bookout, Livonia, Mich., assignor to Ford Motor Company, Dearborn, Mich., a corporation of Delaware
Filed Dec. 12, 1967, Ser. No. 690,019
Int. Cl. F16h 57/10, 37/08, 47/08
U.S. Cl. 74—763                                    6 Claims

ABSTRACT OF THE DISCLOSURE

This specification describes a planetary gear system for an automotive vehicle driveline having torque delivery elements arranged on two spaced parallel axes. The portion that is situated on one axis includes a hydrokinetic torque converter and the portion that is situated on the second axis includes two spaced planetary gear units. The second axis corresponds to the axis of the driven axle of the driveline.

The mechanism is arranged to provide evenly-stepped, forward drive sped ratios and a single reverse speed ratio with a minimum number of friction clutches and brakes.

BRIEF SUMMARY OF THE INVENTION

My invention includes a hydrokinetic, multiple ratio power transmission mechanism for use in an automotive vehicle driveline having an engine arranged transversely with respect to the fore-and-aft axis of the vehicle and parallel to the axle shafts for the traction wheels. The torque delivery paths are defined by two sets of planetary gear elements, one of which is compounded.

The axis of the planetary gear system coincides with the axis of one of the axle shafts. The crankshaft of the engine in the driveline is parallel to the axis of the planetary gear units. The hydrokinetic portion of the driveline is situated concentrically with respect to the axis of the engine crankshaft.

The power output element ofthe hydrokinetic portion of the driveline is connected drivably to the power input element of the planetary gear system through a transfer drive, which preferably is in the form of a chain and sprockets. The ratio shifts in the planetary gear system are accomplished by friction clutches and breaks, five in number, which establish four forward driving speed ratios and a single reverse speed ratio. An additional friction torque establishing device may be used to establish a hill braking condition in low speed ratio and third speed ratio operation, but this can be eliminated if hill braking is not desired in those ratios.

The elements of the gearing are strategically arranged to provide evenly-stepped ratios. The highest speed ratio is a direct drive. But since the ratio speed includes four ratios instead of the usual three in a driveline of this kind, the final drive differential ratio can be reduced. Thus the overall ratio, when the transmission planetary system is conditioned for direct drive, simulates an overdrive ratio condition like that which is achieved in conventional drivelines by adding an overdrive planetary gear unit in combination with a standard three-speed gear box.

The power output element of the planetary gear system is connected drivably to the carrier of the differential gear mechanism, which distributes torque from the output planetary gear member to each of two axle shafts situated in parallel relationship with respect to the engine crankshaft axis.

One axle shaft is arranged concentrically with respect to the planetary gearing system. The over-all driveline thus is suited especially for a composite power-pack assembly with minimum dimensions when measured in the direction of the traction wheel axis.

BRIEF DESCRIPTION OF THE FIGURES OF THE DRAWINGS

FIGURES 1 and 1a show a longitudinal, cross-sectional view of the hydrokinetic portion of the power transmission mechanism of my invention;

PARTICULAR DESCRIPTION OF THE INVENTION

Figures 2, 3:
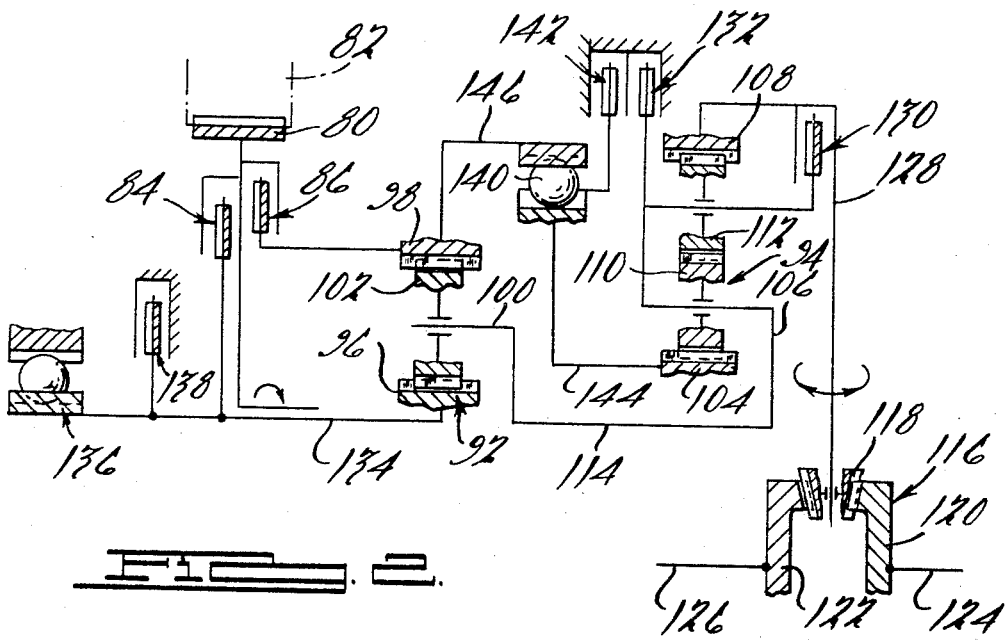
FIGURE 2 shows in schematic form an assembly of the elements of the planetary gear system used in the transmission mechanism of my invention.
FIGURE 3 is a chart showing the clutch and brake engagement and release pattern that is followed during speed ratio changes in the transmission mechanism of FIGURES 1 and 2.

In FIGURE 1 numeral 10 designates a portion of the engine block of an internal combustion engine in an automotive vehicle driveline. The engine includes a crankshaft 12 which is rotatably supported by a bearing 14 located in a bearing opening in the housing 10.

Housing 10 includes an opening 16 which receives a starter motor pinion support 18. This provides a bearing 20 for one end of a pinion shaft 22 which carries rotatably a starter motor pinion 24. As the pinion 24 slides from one position to another, it effects engagement and disengagement with the starter motor ring gear 26. Shaft 22 is driven by a starter motor in the usual fashion.

Ring gear 26 is carried by a first impeller shell part 28. This cooperates with a second impeller shell part 30 to define a closed cavity within which bladed members of the hydrokinetic torque converter are situated. A torque converter is enclosed by a converter housing 32, which is bolted at its outer periphery to a flange 34 formed on the pump chamber 38.

Housing 32 is provided with a hub 36 which defines a pump chamber 28.

A pump rotor drive shaft 45 is keyed or splined to the rotor 42. It is journalled within a bearing opening 46 formed in the end plate 44.

Crankshaft 12 includes an extension 48 which is splined at 50 to the hub 52 for a bladed impeller 54. The impeller includes an outer shroud 56, which is welded to the hub 52. The radially inward margin of the impeller shell part 30 also is welded or otherwise secured to the hub 52. The outer margin of the shroud 56 is secured at 58 to the inner wall of the shell part 30. The impeller blades are carried by the shroud 56 to define radial outflow passages.

A bladed turbine 60 is situated in toroidal fluid-flow relationship with respect to the impeller 54. It includes turbine blades carried by shroud 62 which defines radial inflow pasasges. A bladed stator 64 is located between the flow exit section of the turbine blades and the flow entrance section of the impeller blades. The stator 64 includes flow directing blades carried by a hub 66 which is splined to a stator sleeve shaft 68. The shaft 68 transfers stator torque reaction through an overrunning brake 70 to a stationary sleeve 72 carried by the engine housing 10. Brake 70 will prevent rotation of the stator 64 in a direction opposite to the direction of rotation of the impeller, but it will permit freewheeling motion of the stator 64 in the opposite direction during the coupling phase of the converter operation.

Shroud 62 is connected drivably to turbine hub 74 which, in turn, is splined to a drive sprocket 76. This sprocket is journalled rotatably by bearing 78 on a stationary sleeve 72. The inner margin of the impeller shell part 28 is journalled on the sprocket 76.

A driven sprocket 80 is mounted for rotation about an axis that is spaced from the axis of the crankshaft 12. It is drivably coupled to the sprocket 76 by a drive chain 82. The sprocket 80 is journalled by means of a bearing 85 on a stationary sleeve shaft 87 which, in turn, is connected to the housing. Sprocket 80 includes a first multiple disc clutch assembly 84 which connects drivably the sprocket 80 with a sun gear of a first planetary gear unit. A second multiple disc clutch assembly 86, of which sprocket 80 forms a part, establishes a driving connection between the sprocket 80 and a ring gear for the aforesaid planetary gear unit. Clutches 84 and 86 include, respectively, annular cylinders 88 and 90 formed in the sprocket 80. These receive clutch pistons which activate the clutch discs of the assemblies 84 and 86 when the cylinders 88 and 90 are pressurized.

In FIGURE 2 the planetary gear units are identified, respectively, by reference characters 92 and 94. Planetary gear unit 92 is a simple planetary gear unit, and planetary gear unit 94 is a compound planetary gear unit. Gear unit 92 includes a sun gear 96, a ring gear 98, a planetary carrier 100 and planet pinions 102 journalled on the carrier 100 so that they mesh with ring gear 98 and sun gear 96.

The compound planetary gear unit 94 includes a sun gear 104, a planetary carrier 106 and a ring gear 108. A first set of planet pinions 110 journalled rotatably on the carrier 106 mesh with the sun gear 104. A second set of planetary pinions 112 is journalled rotatably on carrier 106. These mesh with ring gear 108 and with the pinions 110. The carrier 100 is connected to the carrier 106 through a torque delivery sleeve shaft 114.

A differential gear unit 116 is situated on the right-hand side of the gear unit 94. It includes a carrier on which is journalled a pair of bevel pinions 118. These mesh with juxtaposed side gears 120 and 122. A first axle shaft 124 is connected drivably to the side gear 120 and a second axle shaft 126 is connected to the side gear 122. Each axle shaft is connected to a separate traction wheel. Shaft 126 extends through the planetary gear units along a common axis.

The carrier on which the pinions 118 is journalled is connected drivably to ring gear 108 through a torque transfer drum 128. A selectively engageable friction clutch 130 is adapted to connect and disconnect the drum 128 and the carrier 106. The carrier 106 is adapted to be braked selectively by friction brake 132. The rationale of the friction brake 132 is connected to the transmission housing.

Sun gear 96 of the gear unit 92 is connected to a sun gear sleeve shaft 134 which is adapted to be braked to the transmission housing through an overrunning brake 136. Brake 136 accommodates torque delivery to the housing in one direction only. If bidirectional torque reaction is desired (for example, during hill braking operation), a friction brake 138 may be provided for anchoring the shaft 134.

Ring gear 98 is adapted to be coupled to the sun gear 104 through an overrunning clutch 140. Torque delivery between ring gear 98 and sun gear 104 occurs in one direction only because of the overrunning characteristics of the coupling. If it is desired to provide bidirectional torque reaction for the sun gear 104 (for example, during low speed ratio operation and second speed ratio operation), a friction brake 142 can be applied. This anchors the inner race of the clutch 140 to which the sun gear 104 is connected through sleeve shaft 144. The outer race of the overrunning clutch 140 is connected to ring gear 98 through element 146.

During operation, planetary gear unit 92 serves as a ratio splitter. The elements of the gear unit 92 are clutched together for rotation in unison when the clutch 84 is applied. This condition occurs whenever the mechanism is conditioned for second speed ratio operation or high speed ratio operation. Clutch 84 is applied also during reverse drive.

To condition the mechanism for first speed ratio operation, clutch 86 is applied and brake 142 is applied. The turbine torque delivered by the hydrokinetic turbine is transferred through the chain drive and through the engaged clutch 86 to the ring gear 98. Sun gear 96 acts as a reaction member since it is anchored against the housing through overrunning brake 136. The carrier torque is distributed to the carrier 106. Brake 142 anchors the sun gear 104 so that the latter acts as a reaction member for the gear unit 94. Ring gear 108 acts as a power output element and its torque is distributed through differential gear unit 116 to the axle shafts. If coast braking is desired at this time, brake 138 can be applied.

A ratio shift to the second speed ratio is achieved simply by engaging clutch 84. This locks-up the gear unit 92 so that the gear unit 94 provides the only torque multiplication. Overrunning brake 136 freewheels at this time.

Third speed ratio operation is achieved by engaging clutch 130 as clutch 84 is disengaged. Clutch 86 remains applied during operation in each of the four driving speed ratios. Gear unit 92 again multiplies torque as the ring gear 98 receives the input torque from the chain drive. As seen, gear 96 acts as a reaction member with its reaction torque being distributed to the housing through overrunning brake 136. Clutch 130 locks out the elements of the gear unit 94 to cause rotation of the gear elements in unison. Gear unit 92 thus acts as the sole torque multiplying unit.

When the front planetary gear unit 92 is locked up by engaging clutch 84, a 1:1 over-all speed ratio is achieved. Overrunning brake 136 then freewheels.

Reverse drive is achieved by engaging clutch 84 and releasing clutch 86. The chain drive torque then is distributed directly to the sun gear 96. Brake 132 is applied. Thus the carrier 106 acts as a reaction member and torque applied to the sun gear 96 is multiplied. The driving motion is reversed by the gear unit 92. The reverse motion on the ring gear 98 causes the sun gear 104 to rotate in a reverse direction since a connection is established between ring gear 98 and the sun gear 104 at that time through the overrunning clutch 140. This is the only operating condition in which the overrunning clutch 140 is locked up. Ring gear 108 now is driven in a reverse direction because of the reverse motion of the sun gear 104.

Typical values for the torque ratios in each of the forward driving modes are computed as follows:

$$(1\text{st}) = \frac{1}{1 - S_2/R_2} \times \left(1 + \frac{S_1}{R_2}\right)$$

$$(2\text{nd}) = \frac{1}{1 - S_2/R_2}$$

$$(3\text{rd}) = 1 + \frac{S_1}{R_1}$$

where $S_1$ and $S_2$ are the number of teeth in the sun gear of the units 92 and 94, respectively, and $R_1$ and $R_2$ are the corresponding number of teeth for the associated ring gears.

Having thus described a preferred form of my invention, what I claim and desire to secure by U.S. Letters Patent is:

1. A multiple speed-ratio geared power transmission mechanism for an automotive vehicle driveline comprising a simple planetary gear unit, a compound planetary gear unit, said gear units having a common axis, a power input shaft situated for rotation about an axis that is spaced and parallel to said common axis, said simple planetary gear unit including a ring gear, a sun gear, a carrier and planet pinions mounted on said carrier in meshing engagement with said sun and ring gears, said compound planetary gear unit including a ring gear, a sun gear, a carrier and first and second planetary pinion sets journalled on said carrier in meshing engagement with each other, one pinion set engaging said ring gear and the other pinion set engaging said sun gear, a power output shaft arranged coaxially with respect to said gear units, a geared connection between said power output shaft and the ring gear of said compound planetary gear unit, driving means including relatively engageable clutch means for connecting said power input shaft to the ring gear of said simple planetary gear unit, second selectively engageable clutch means for connecting together the elements of said simple planetary gear unit for rotation in unison, brake means for anchoring the sun gear of said simple planetary gear unit during operation of said mechanism in alternately stepped speed ratios, brake means for selectively anchoring the carrier of said compound planetary gear unit, third clutch means for connecting together elements of said compound planetary gear unit for effecting rotation in unison thereof, another selectively engageable brake means for anchoring the sun gear of said compound planetary gear unit during operation in the lowest speed ratio and the second lowest speed ratio, and coupling means for connecting the ring gear of said simple planetary gear unit to the sun gear of said compound planetary gear unit during reverse drive operation.

2. The combination as set forth in claim 1 wherein said brake means for anchoring the sun gear of said simple planetary gear unit includes a unidirectional brake adapted to anchor said sun gear against a stationary member to inhibit rotation in one direction and a friction brake means for anchoring said sun gear to said stationary member to inhibit rotation in each direction, the connection between the ring gear of said simple planetary gear unit and the sun gear of said compound planetary gear unit including an overrunning coupling adapted to transfer torque in one direction by permitting freewheeling motion in the opposite direction.

3. The combination as set forth in claim 2 wherein the geared connection between said power output shaft and the ring gear of said compound planetary gear unit includes a differential gear unit comprising differential pinions and gears engageable with said pinions, said power output shaft being connected to one of said side gears and being situated in a direction normal to the plane of rotation of said differential pinions.

4. A multiple speed-ratio geared power transmission mechanism for an automotive vehicle driveline comprising a simple planetary gear unit, a compound planetary gear unit, said gear units having a common axis, a power input shaft situated for rotation about an axis that is spaced and parallel to said common axis, said simple planetary gear unit including a ring gear, a sun gear, a carrier and planet pinions mounted on said carrier in meshing engagement with said sun and ring gears, said compound planetary gear unit including a ring gear, a sun gear, a carrier and first and second planetary pinion sets journalled on said carrier in meshing engagement with each other, one pinion set engaging said ring gear and the other pinion set engaging said sun gear, a power output shaft arranged coaxially with respect to said gear units, a geared connection between said power output shaft and the ring gear of said compound planetary gear unit, driving means including a relatively engageable clutch means for connecting said power input shaft to the ring gear of said simple planetary gear unit, second selectively engageable clutch means for connecting together the elements of said simple planetary gear unit for rotation in unison, brake means for anchoring the sun gear of said simple planetary gear unit during operation of said mechanism in alternately stepped speed ratios, brake means for selectively anchoring the carrier of said compound planetary gear unit, third clutch means for connecting together elements of said compound planetary gear unit for effecting rotation in unison thereof, another selectively engageable brake means for anchoring the sun gear of said compound planetary gear unit during operation in the lowest speed ratio and the second lowest speed ratio, coupling means for connecting the ring gear of said simple planetary gear unit to the sun gear of said compound planetary gear unit during reverse drive operation, an internal combustion engine including a crankshaft having an axis of rotation that is common to the axis of said driving shaft, a hydrokinetic torque converter comprising a driven impeller and a starter situated in toroidal fluid flow relationship, said crankshaft being connected to said impeller, said turbine being connected to said driving member, said driving member being arranged concentrically with respect to said crankshaft, and a chain and sprocket drive connection connecting drivably said driving member and said first clutch means.

5. The combination as set forth in claim 4 wherein said brake means for anchoring the sun gear of said simple planetary gear unit includes a unidirectional brake adapted to anchor said last-named sun gear against a stationary member to inhibit its rotation in one direction and a friction brake means for anchoring the same to said stationary member to inhibit its rotation in each direction, the connection between the ring gear of said simple planetary gear unit and the sun gear of said compound planetary gear unit including an overrunning coupling adapted to transfer torque in one direction while permitting freewheeling motion in the opposite direction.

6. The combination as set forth in claim 5 wherein the geared connection between said power output shaft and the ring gear of said compound planetary gear unit includes a differential gear unit comprising differential pinions, and side gears engageable with said pinions, said power output shaft being connected to one of said side gears and being situated in a direction normal to the plane of rotation of said differential pinions.

References Cited
UNITED STATES PATENTS

| | | | |
|---|---|---|---|
| 2,886,983 | 5/1959 | Miller | 74—759 |
| 3,029,662 | 4/1962 | Hause | 74—695 |
| 3,255,643 | 6/1966 | Haase | 74—695 |
| 3,386,314 | 6/1968 | Stockton | 74—763 X |

ARTHUR T. McKEON, *Primary Examiner.*

U.S. Cl. X.R.

74—695, 730